(12) United States Patent
Kondo et al.

(10) Patent No.: US 7,689,066 B2
(45) Date of Patent: Mar. 30, 2010

(54) OPTICAL MODULATOR

(75) Inventors: Jungo Kondo, Nishikamo-Gun (JP); Osamu Mitomi, Nagoya (JP); Kenji Aoki, Ichinomiya (JP); Yuichi Iwata, Nagoya (JP); Tetsuya Ejiri, Kasugai (JP)

(73) Assignee: NGK Insulators, Ltd., Nagoya-Shi (JP)

( * ) Notice: Subject to any disclaimer, the term of this patent is extended or adjusted under 35 U.S.C. 154(b) by 4 days.

(21) Appl. No.: 11/841,188

(22) Filed: Aug. 20, 2007

(65) Prior Publication Data

US 2008/0025662 A1 Jan. 31, 2008

Related U.S. Application Data

(63) Continuation of application No. PCT/JP2006/303509, filed on Feb. 20, 2006.

(30) Foreign Application Priority Data

Feb. 22, 2005 (JP) .............................. 2005-045154

(51) Int. Cl.
*G02F 1/035* (2006.01)
*G02B 6/26* (2006.01)

(52) U.S. Cl. ............................................. 385/3; 385/30

(58) Field of Classification Search ..................... 385/3, 385/30
See application file for complete search history.

(56) References Cited

U.S. PATENT DOCUMENTS

| | | | | |
|---|---|---|---|---|
| 5,259,044 | A * | 11/1993 | Isono et al. | 385/2 |
| 5,627,929 | A | 5/1997 | Vawter et al. | |
| 5,655,041 | A * | 8/1997 | Forrest et al. | 385/49 |
| 5,953,466 | A | 9/1999 | Kubota et al. | |
| 6,055,342 | A * | 4/2000 | Yi et al. | 385/2 |
| 6,400,490 | B1 * | 6/2002 | Hosoi | 359/254 |
| 6,668,103 | B2 * | 12/2003 | Hosoi | 385/2 |
| 6,785,434 | B2 * | 8/2004 | Castoldi et al. | 385/14 |
| 2001/0009594 | A1 * | 7/2001 | Hosoi | 385/2 |
| 2001/0046343 | A1 * | 11/2001 | Carmannini | 385/14 |
| 2002/0006245 | A1 | 1/2002 | Kubota et al. | |
| 2002/0025103 | A1 * | 2/2002 | Thaniyavarn | 385/15 |
| 2002/0136478 | A1 * | 9/2002 | Yasuyuki et al. | 385/2 |

(Continued)

FOREIGN PATENT DOCUMENTS

GB     2 319 356     5/1998

(Continued)

*Primary Examiner*—K. Cyrus Kianni
(74) *Attorney, Agent, or Firm*—Burr & Brown

(57) ABSTRACT

An optical modulator is provided for modulating light propagating in a three-dimensional optical waveguide 5 by applying a voltage thereto. The optical modulator has the three-dimensional optical waveguide 5 including at least one pair of branch optical waveguides 5c and 5d, a multiplexing part 5e of the branch optical waveguides and an emission part 5f provided in the downstream of the multiplexing part, modulation electrodes 3A, 3B and 4 for applying a signal voltage for modulating light propagating in the three-dimensional optical waveguide 5, and guiding waveguides 6A and 6B for guiding primary mode light from the multiplexing part. Thickness of the substrate is 20 μm or less at least under the modulation electrodes, and an operation point of the optical modulator is controlled by changing, based on light output from the guiding waveguides, DC bias applied onto the modulation electrodes.

5 Claims, 11 Drawing Sheets

U.S. PATENT DOCUMENTS

| | | | |
|---|---|---|---|
| 2002/0191886 A1* | 12/2002 | Castoldi et al. | 385/14 |
| 2003/0138180 A1 | 7/2003 | Kondo et al. | |
| 2004/0234199 A1* | 11/2004 | Melloni et al. | 385/32 |
| 2008/0013890 A1* | 1/2008 | Milette | 385/59 |

FOREIGN PATENT DOCUMENTS

| | | |
|---|---|---|
| JP | 03-145623 | 6/1991 |
| JP | 8-184720 | 7/1996 |
| JP | 10-153719 | 6/1998 |
| JP | 10-228006 | 8/1998 |
| JP | 2001-004852 | 1/2001 |
| JP | 2002-023123 A1 | 1/2002 |
| JP | 2003-215518 A1 | 7/2003 |

* cited by examiner (a)

(b)

OPTICAL MODULATOR

FIELD OF THE INVENTION

The present invention relates to an optical modulator using a so-called Mach-Zehnder optical waveguide.

SUMMARY OF THE INVENTION

A traveling-wave high-speed optical modulator using a Mach-Zehnder optical waveguide has drawn attention due to its wide wavelength band and low chirp characteristic. This type of optical modulators is adapted to propagate light in a pair of branch optical waveguides, respectively, and merge output from each branch optical waveguide together in its multiplexing part. However, shift of operational point and so-called DC drift may be caused between the pair of branch optical waveguides due to a temperature difference or the like. A Mach-Zehnder (MZ) LN optical modulator generally involves the shift of operational point caused by temperature drift, DC drift, stress by a change with time or the like, resulting in a deterioration of extinction ratio. This problem is important in operation of the modulator.

Several methods have been proposed to control such shift of operating point or DC drift. According to a method described in Japanese Patent Publication No. H3-145623A as a typical example, attention is paid to light of substrate radiation mode which is radiated from a multiplexing part of a pair of branch optical waveguides into a substrate. Namely, in on-mode, light incident onto the optical waveguide is propagated in the waveguides and radiated from the end surfaces of the waveguides. Light of off-mode is radiated from the optical waveguides into the substrate as light of substrate radiation mode. An optical fiber is attached to an end surface of the substrate to receive the light of substrate radiation mode, and outgoing light from the optical fiber is detected by an optical detector. The DC bias of voltage applied from modulation electrodes to the optical waveguides is changed using an output signal from the optical detector, whereby the operating point of the optical modulator is adjusted.

In this case, however, since the radiation light is diffused into the substrate at the outgoing end surface, the optical intensity of the radiation light is low. It is thus very difficult to align the radiation light by the optical fiber. Therefore, it is required to stably control the operational point of the optical modulator.

To solve this problem, in Japanese Patent Application No. H9-32489A (Publication No. H10-228006A), an optical guide part for guiding light radiated or leaked from an optical waveguide is provided. DC bias is controlled by interfering the light radiated from the light guide part with signal light leaked from the optical waveguide to generate interference light and monitoring this interference light.

The present inventor developed an optical modulator of a thin plate structure, and disclosed a method for efficiently controlling the operational point by drift in this structure, in Japanese Patent Application No. 2002-328683 (Publication No. 2003-215518A). A substrate thinned to 20 μm or less functions as a slab waveguide having a finite lateral width (the lateral width of the substrate) (the lateral width is generally treated as infinity in design of device structure). Lateral primary mode light generated in a Y-branch multiplexing part is made into slab mode and propagated in the thin-plate substrate with a low loss. Since this slab mode light is condensed into the thin-plate substrate (slab waveguide), different from a conventional modulator, sufficient radiation intensity can be ensured.

DISCLOSURE OF THE INVENTION

The present inventors found that radiation light generated in the Y-branch multiplexing part propagates as primary mode light in the optical waveguide in case of the thin-plate modulator. They then tried to control the DC bias by using and monitoring the primary mode light. However, the peak-to-peak distance of the primary mode light is 10 μm to 100 μm or less to signal light, and this makes it difficult to take out the primary mode light as monitor light separately from the signal light.

An object of the present invention is to enable satisfactory control, at the time of taking out primary mode light as monitor light to a light detection means and performing feedback control of bias voltage based on the optical signal, by separating the primary mode light from the signal light at high efficiency to reduce the loss of the primary mode light.

The present invention provides an optical modulator for modulating light propagating in a three-dimensional optical waveguide by applying a voltage thereto. The modulator comprises:

a substrate comprising a ferroelectric material;

a three-dimensional optical waveguide comprising at least a pair of branch optical waveguides, a multiplexing part of the branch optical waveguides and a waveguide part provided in the downstream of the multiplexing part;

a modulation electrode for applying a signal voltage for modulating light propagating in the three-dimensional optical waveguide; and a primary mode light guiding waveguide for guiding primary mode light from the multiplexing part. The thickness of the substrate is 20 μm or less at least under the modulation electrode, and the operational point of the optical modulator can be controlled by changing the DC bias applied onto the modulation electrode based on optical output from the guiding waveguide.

The present inventors found that, as the substrate thickness is reduced, confinement of light into the substrate is enhanced due to the presence of a low-dielectric constant layer or air layer in the thickness direction, so that the curving loss of the optical waveguide can be extremely reduced. For example, FIG. 6 shows the calculation results of optical loss of primary mode light to LN substrate thickness at a wavelength of 1.55 μm and a curvature radius of waveguide of 5 mm. It was found from the results that, even if the optical waveguide is curved, the optical loss can be reduced to 10 dB or less which is an unthinkable level in actual operation when the substrate thickness is 20 μm or less. It was also found that increase in curvature radius of the optical waveguide allows further reduction in the loss, and the optical loss can be reduced to 10 dB or less when the substrate thickness is 10 μm even in the case having a curvature radius of 1 mm.

The present inventors have simulated based on such knowledge to provide a guiding waveguide for propagating the primary mode light in the vicinity of a multiplexing part of a three-dimensional optical waveguide for propagating signal light so that the primary mode light is propagated separately from the signal light. Consequently, they found that operational point of the optical modulator can be easily controlled by considerably separating the light receiving point of the primary mode light from the light receiving point of the signal light from the above-mentioned reasons. The present invention is thus attained.

DETAILED DESESCIPTION OF THE PRESENT INVENTION

The present invention will be described further in detail in reference to the accompanying drawings.

Figure 1:
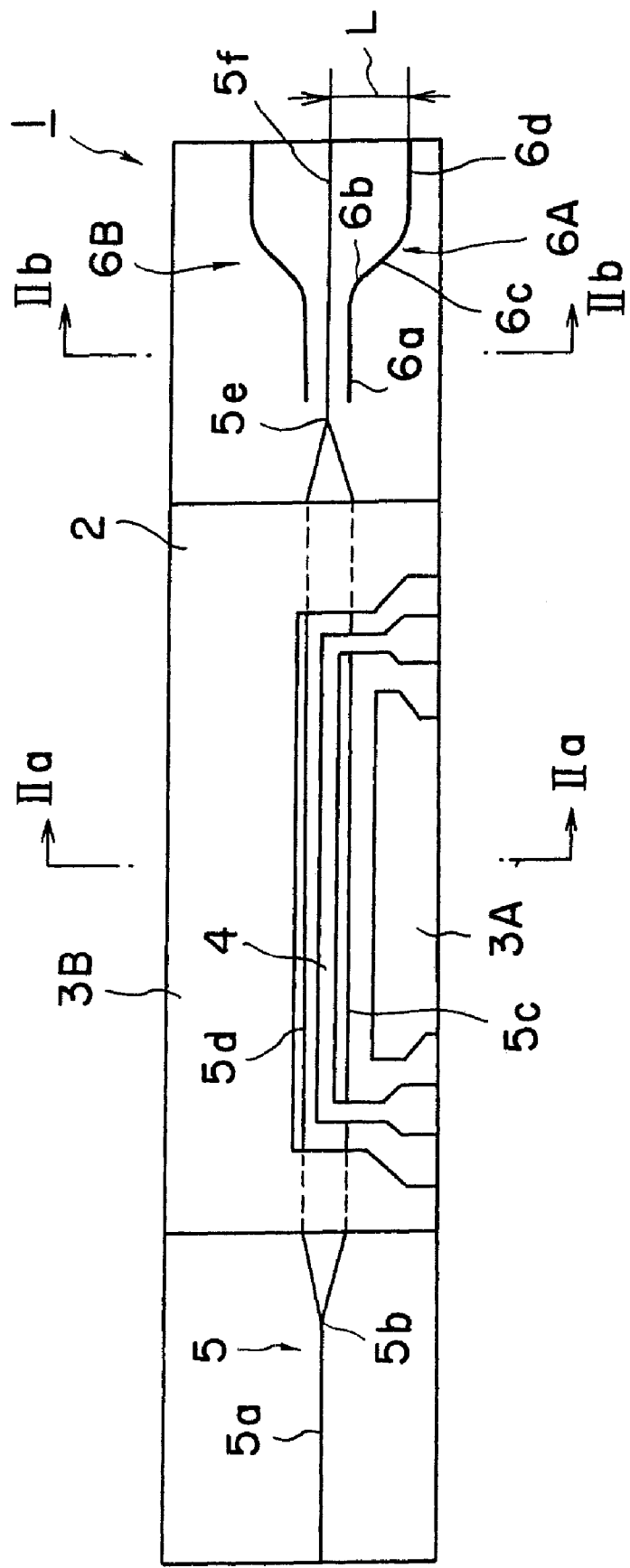
FIG. 1 is a plan view illustrating an optical modulator 1 according to one embodiment of the present invention.

FIG. 1 is a plan view of an optical modulator 1 according to one embodiment of the present invention, and FIGS. 2(a) and (b) are sectional views of FIG. 1, which are taken along lines IIa-IIa and IIb-IIb, respectively.

According to an optical modulation device 8 of this embodiment, the bottom surface of a substrate 2 of the optical modulator 1 is adhered to a surface of a support substrate 7 directly or through an adhesive layer not shown. A Mach-Zehnder three-dimensional optical waveguide 5 and modulation electrodes 3A, 3B and 4 are formed on the surface of the optical modulator 1. The optical waveguide 5 has an incident part 5a, a pair of branch optical waveguides 5c, 5d and an emission part 5f. Denoted at 5b is a branch point, and 5e is a multiplexing part. Since the control method of the light propagating in the optical waveguide 5 and the structure of the modulation electrodes are known, descriptions thereof are omitted.

Figure 3:
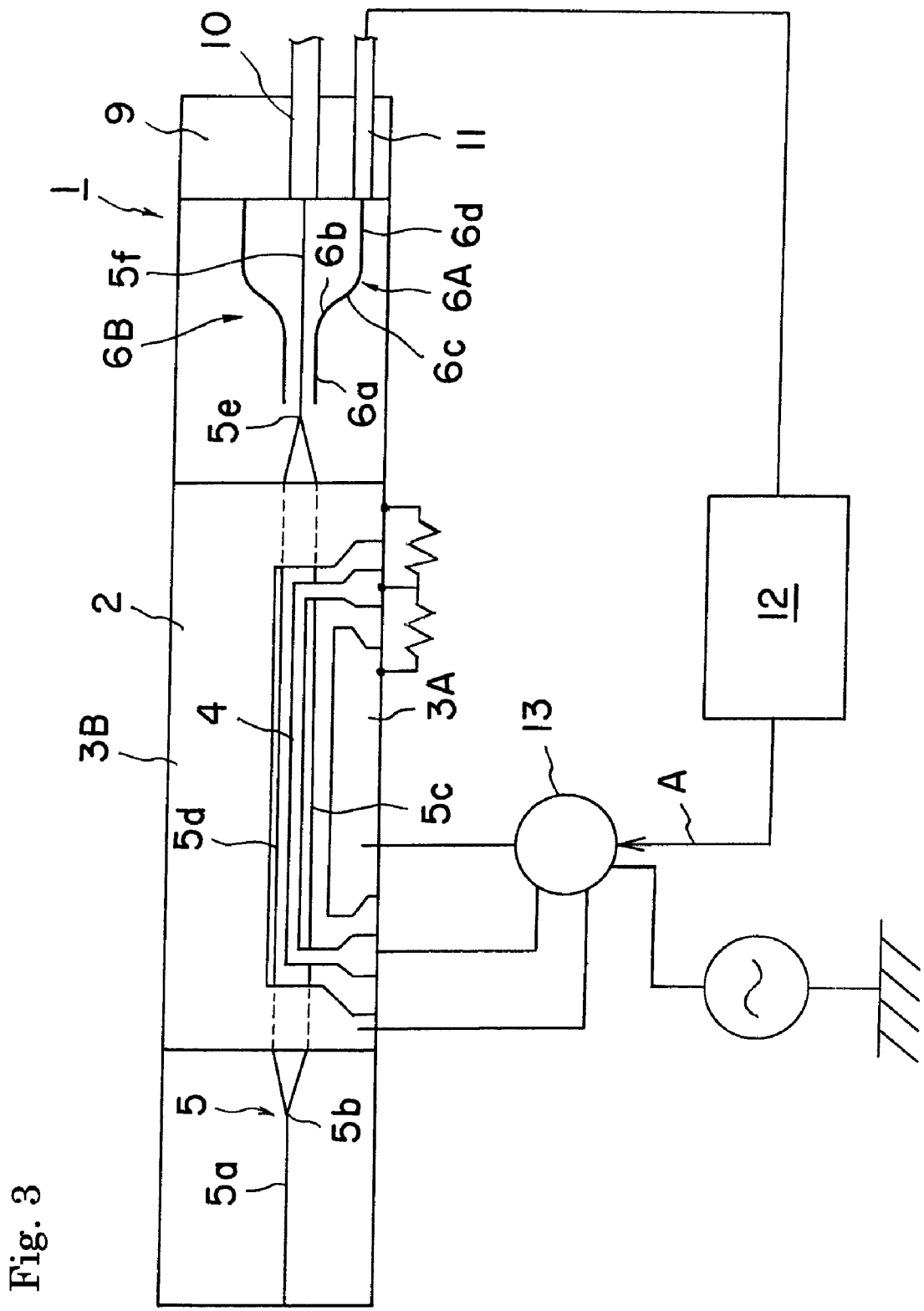
FIG. 3 is a schematic view illustrating the feedback mechanism of the optical modulator of FIG. 1.

Signal light exits from an end surface of the emission part 5f of the three-dimensional optical waveguide. As shown in FIG. 3, for example, the signal light is transferred through an optical fiber 10 by attaching an optical fiber array 9 to the emitting-side end face of the optical modulator 1.

On the other hand, primary mode light exits from the vicinity of the multiplexing part 5e. Edges of a pair of primary mode light guiding waveguides 6A and 6B are located in the vicinity of the multiplexing part 5e. In this embodiment, the primary mode light guiding waveguides 6A and 6B are disposed at both sides of the multiplexing part 5e. Each guiding waveguide is composed of a channel optical waveguide.

Each guiding waveguide 6A, 6B has an introduction part 6a having an edge located in the vicinity of the multiplexing part 5e, curved parts 6b and 6c, and an emission part 6d. The respective emission parts 6d of the guiding waveguides are exposed to an end face of the optical modulator. The emission part 6d of one guiding waveguide is connected with an optical transmission member 11. As such an optical transmission member, an optical fiber is preferably used. In this embodiment, by providing the curved parts 6b and 6c, the emission part 6d for light receiving can be formed in a position sufficiently distant from the emission part 5f for signal light while locating the introduction part 6a in the vicinity of the multiplexing part 5e.

In this embodiment, the emission part 6d of the guiding waveguide can be laid substantially in parallel to the signal light emission part 5f. A distance L between the emission part of the guiding waveguide and the signal light emission part 5f is set to preferably 120 μm or more, more preferably 240 μm or more, from a viewpoint of raising the SN of monitor light to signal light at the time of light receiving.

The optical transmission member 11 is connected to a light receiving device. The light receiving device converts the received light to an electric signal and transmits the signal to an automatic bias control circuit 12. The automatic bias control circuit 12 calculates an appropriate DC bias value from information carried by the primary mode light, and transmits a control signal to a bias tee circuit 13, as shown by an arrow A, to change DC bias as occasion demands. A3

Figure 4:
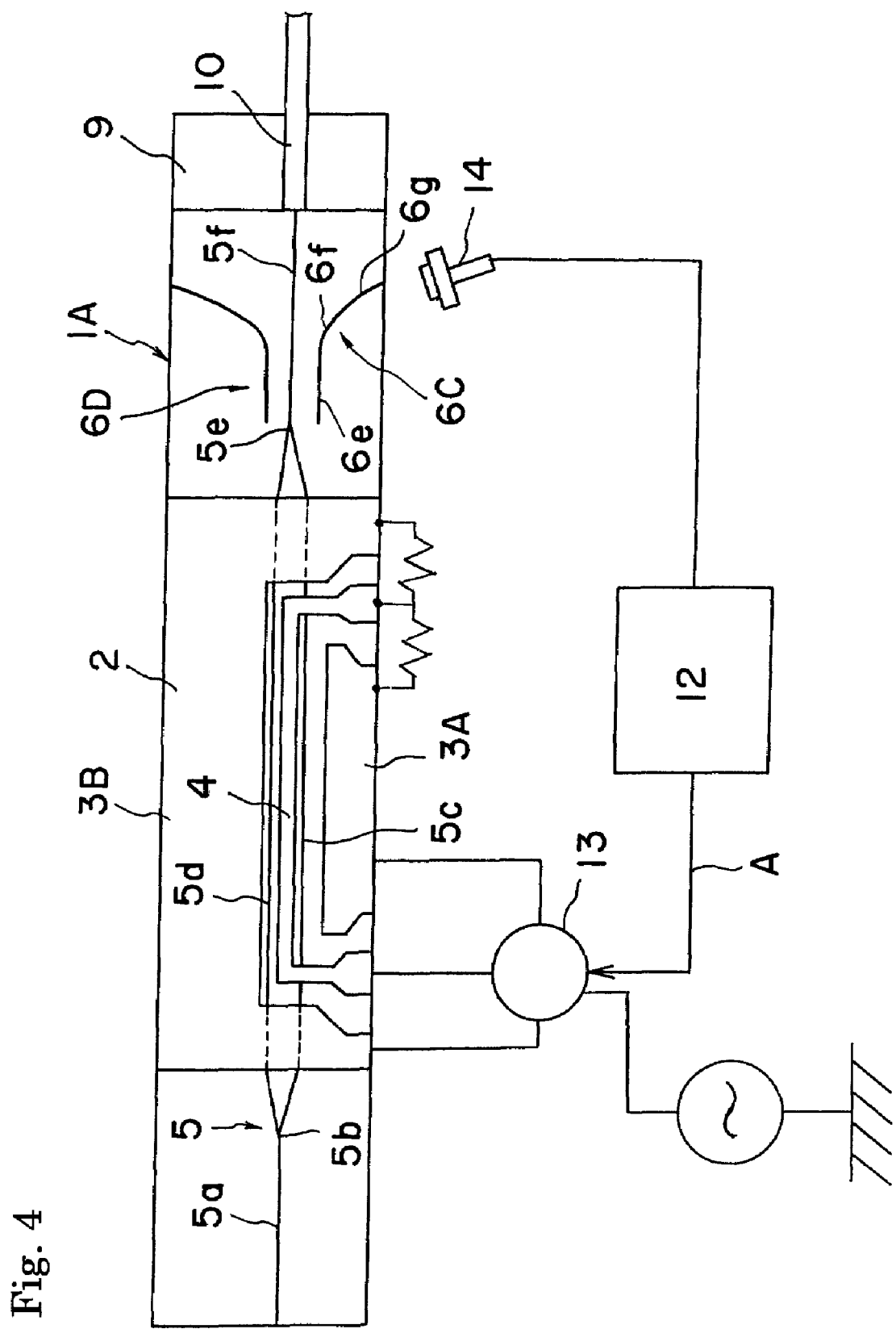
FIG. 4 is a plan view illustrating an optical modulator 1A according to another embodiment of the present invention.

In the optical modulator 1A of FIG. 4, edges of a pair of primary mode light guiding waveguides 6C and 6D are located in the vicinity of the multiplexing part 5e. In this embodiment, the primary mode light guiding waveguides are disposed at both sides of the multiplexing part 5e. Each guide waveguide is composed of a channel optical waveguide.

Each guiding waveguide 6C, 6D comprises an introduction part 6e having an edge located in the vicinity of the multiplexing part 5e, a curved part 6f curved outwardly, and an emission part 6g. The respective emission parts 6g of the guide waveguides are exposed to side faces of the optical modulator. The emission part 6g of one guiding waveguide is opposed to a light receiving device 14 set on the side face. In this embodiment, by providing the curved part 6f, the emission part 6g for light receiving is located on the side face of the substrate while locating the introduction part 6e in the vicinity of the multiplexing part 5e.

The light receiving element 14 converts received light to an electric signal and transfers the signal to the automatic bias control circuit 12 through a cable. The automatic bias control circuit 12 calculates an appropriate DC bias value from information carried by the primary mode light, and transmits a control signal to a bias tee circuit 13, as shown by the arrow A, to change DC bias as occasion demands.

Although measurement of light intensity is preferred in the optical detector, phase or wavelength of light may be also measured. The kind of the optical detector is not particularly limited. When modulation of light is performed with an electric signal of 10 Gb/s, for example, an InGaAs-based optical detector with high response speed which has a sufficient bandwidth for detection or the like is used.

The form of the multiplexing part is not particularly limited. Each branch optical waveguide may intersect at the multiplexing part, or may be spatially separated. However, it is necessary that optical energy propagated in each branch optical waveguide can merge at the multiplexing part.

Although at least one pair of the branch optical waveguides is needed, two or more pairs thereof may be present. A so-called cascade type optical waveguide can be adapted.

The three-dimensional optical waveguide and the guiding waveguide can be formed by proton exchange method, titanium internal diffusion method or metal ion diffusion method. Alternatively, a ridge type three-dimensional optical waveguide can be formed by removing a surface of a substrate by machining or laser ablation.

In a preferred embodiment, the three-dimensional optical waveguide and the guiding waveguide are composed of ridge type optical waveguides protruded from the substrate 2, respectively. Such a three-dimensional optical waveguide can be formed by the above-mentioned method. Otherwise, the ridge type three-dimensional optical waveguide can be formed by forming, on a surface of a slab optical waveguide, a high-refractive index film by, for example, chemical vapor deposition, physical vapor deposition, organic metal chemical vapor deposition, sputtering or liquid phase epitaxial and by performing machining or laser ablation of the high-refractive index film.

As the material forming the substrate of the optical modulator, any light-transmitting material such as ferroelectric single crystal, glass or optical resin can be used. Particularly, the ferroelectric single crystal is preferably used, including lithium niobate, lithium tantalate, lithium niobate-lithium tantalite solid solution, potassium lithium niobate, potassium lithium tantalate, potassium lithium niobate-potassium lithium tantalite solid solution and KTP.

In a preferred embodiment, the optical modulator has an adhesive layer for adhering the support substrate 7 to the optical modulator. As the material constituting the support substrate, ferroelectric single crystal, glass and resin as described above may be suitably used. As the adhesive, glass or resin is preferred.

The above-mentioned glass preferably has low dielectric constant and an adhesion temperature (working temperature) of about 600° C. or lower. Further, a one capable of providing sufficient adhesive strength at the time of working is preferred. Concretely, so-called solder glass obtained by combining two or more compositions of silicon oxide, lead oxide, aluminum oxide, magnesium oxide, potassium oxide, boron oxide and the like is preferably used. As the above-mentioned resin, room temperature-curable, heat-curable and ultraviolet-curable resins are preferred and resins with low dielectric constant are preferred. Practically, epoxy, acryl and urethane resins are particularly preferred.

Figure 5:
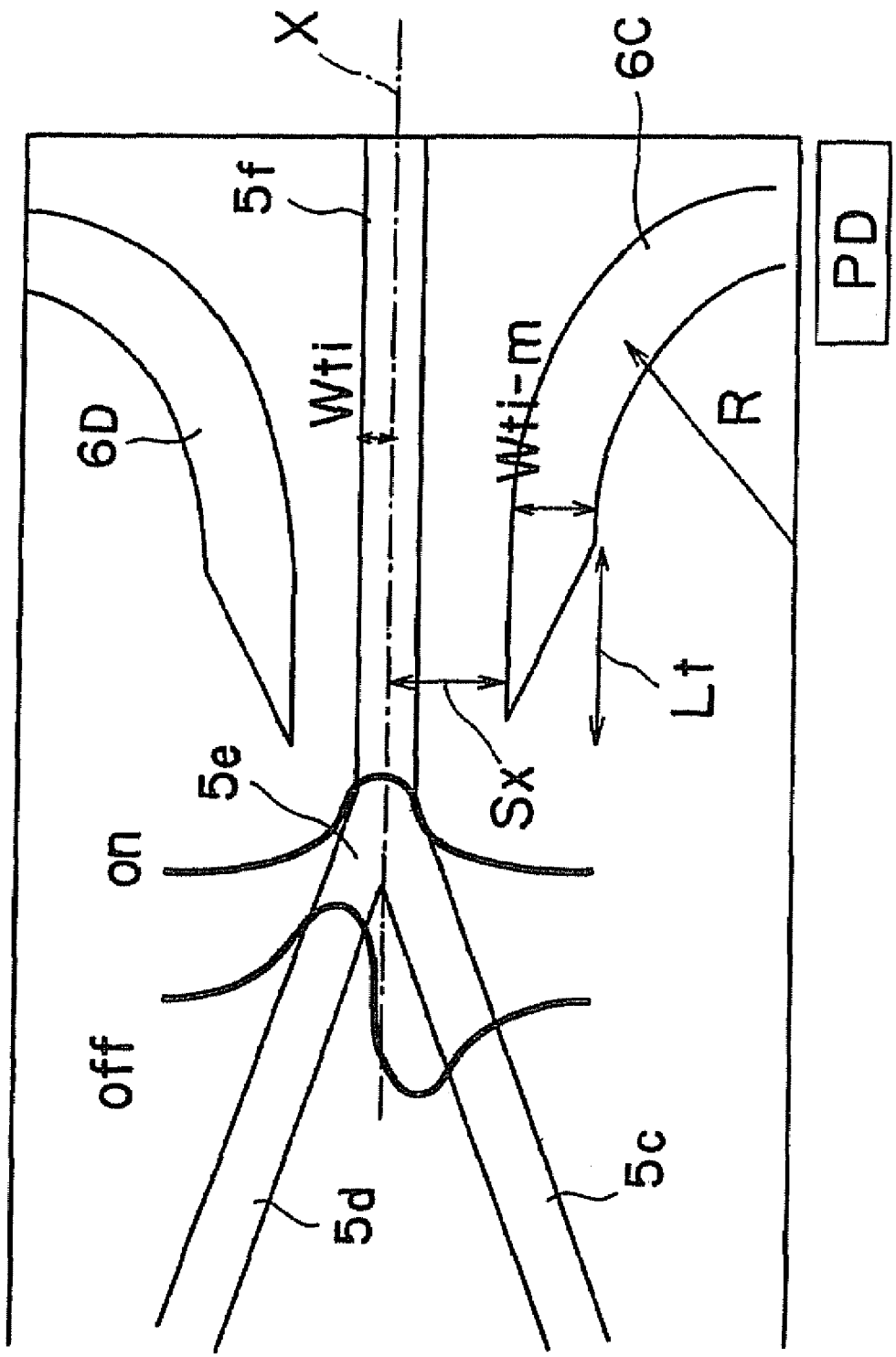
FIG. 5 is a plan view illustrating a connection part of an edge of each guide waveguide with a multiplexing part 5e.

FIG. 5 is an enlarged schematic view illustrating a connection part between the primary mode light guiding waveguide and the multiplexing part 5e. Denoted at on-light is the signal light, and off-light is the primary mode light used for the feedback control. Distance Sx from central axis X of the emission part 5f to the guide waveguide 6C (or 6A, 6B, 6D) is not particularly limited as long as shift of optical energy is allowed, but is preferably 100 μm or less and, more preferably, 50 μm or less, from a viewpoint of suppressing the loss in the shift of the optical energy. For preventing a crosstalk between the signal light and primary mode light or the deterioration of extinction ratio, the distance is set preferably to 10 μm or more and, more preferably, to 15 μm or more.

The optical waveguide for primary mode is preferably disposed so that its central position is matched with the central position of the primary mode light. From this point of view, the distance Sx is set preferably to 10 μm to 100 μm and, more preferably to 10 μm to 50 μm.

The substrate thickness in the electrode part is 20 μm or less. From the viewpoint of reduction in the loss in the curved part of the guiding wave guide, it is more preferably 15 μm or less and, most preferably, 10 μm or less. When the optical waveguide has a curved part, similarly, the substrate thickness under the curved part is set preferably to 20 μm or less, more preferably to 15 μm or less, and most preferably to 10 μm or less.

The primary mode light guiding waveguides are preferably provided in both sides of the emission part 5f for propagating the signal light. According to this, the primary mode light can be completely kept away from the vicinity of the signal light. The conventional unwanted component of OFF-light coupled with the outgoing-side optical fiber can be removed to remarkably improve the extinction ratio.

In a preferred embodiment, the guide waveguide has a curved part. The loss in the curved part is remarkably reduced by setting the thickness of the optical modulator substrate to 20 μm or less. The guiding waveguide can thus be designed to be curved so that the primary mode light emission part can be considerably separated from the signal light emission part.

From the viewpoint of suppressing the optical loss in the guiding waveguide, the curvature radius R of the curved part is set preferably to 1 mm or more and, more preferably, 2 mm or more. On the other hand, from the viewpoint of curving the guiding waveguide as largely as possible to increase the distance between the primary mode light emission part and the signal light emission part, the curvature radius R of the curved part is set preferably to 30 mm or less and, more preferably, to 15 mm or less.

EXAMPLES

Example 1

Figure 2:
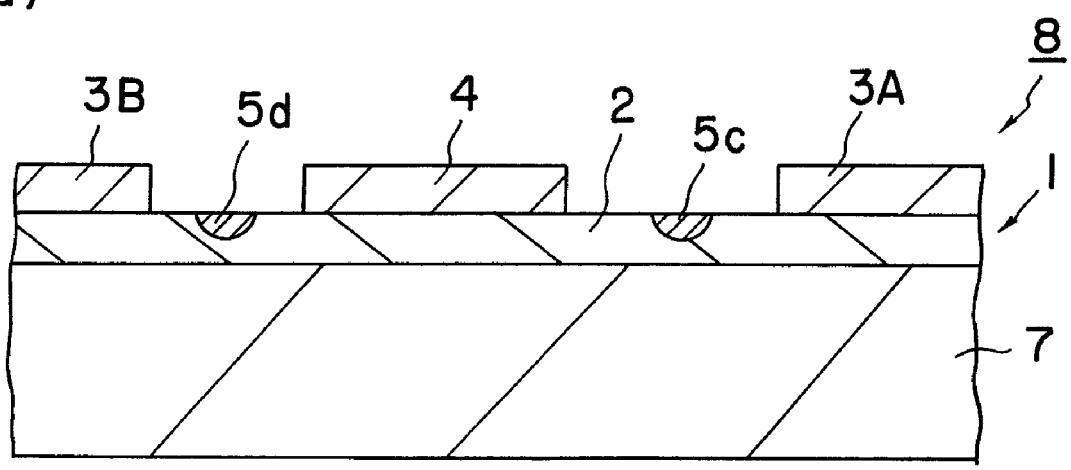
FIGS. 2(a) and (b) are cross-sectional views of FIG. 1, which are taken along lines IIa-IIa and IIb-IIb, respectively.
Figure 2:
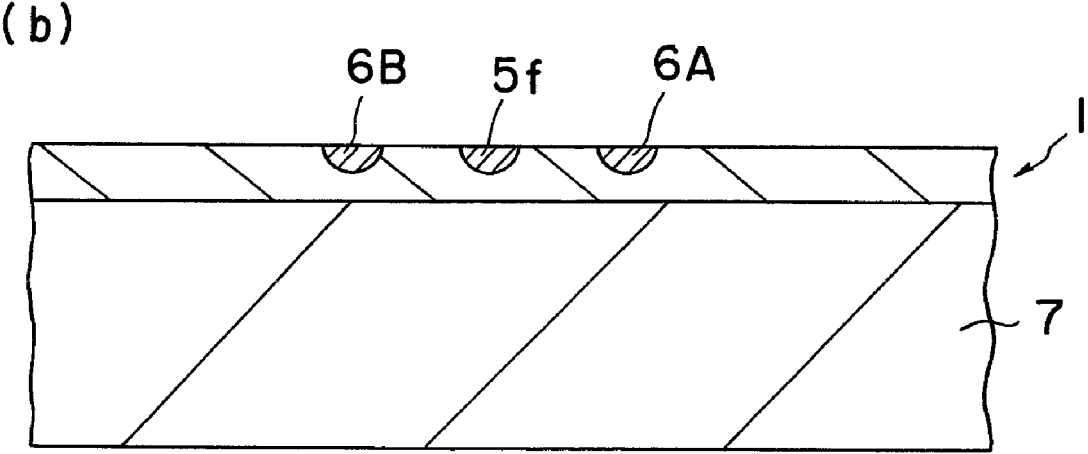

The optical modulator 1 of FIG. 1 was manufactured according to the method described in reference to FIGS. 1 to 3 and tested. Concretely, a substrate consisting of an X-cut 3-inch wafer (LiNbO$_3$ single crystal) is used, and a Mach-Zehnder optical waveguide 5 is formed on a surface of the wafer by titanium diffusion process and photolithography. A CPW electrode is formed by plating process. The gap of a central electrode 4 to ground electrodes 3A and 3C is 25 μm, the electrode thickness is 20 μm, and the electrode length is 32 mm. A grinding dummy substrate is stuck to a grinding surface plate for thinning grinding, and the modulator substrate is stuck thereto through a thermoplastic resin with the electrode surface down. Further, the substrate body is thinned to a thickness of 8 μm by horizontal grinding and polishing (CMP). Thereafter, the flat plate-like support substrate 7 is adhered and fixed to the substrate body, and a connection part for an optical fiber is end surface-polished and cut into chips by dicing. As the resin for the adhesion and fixing, an epoxy resin having a resin thickness of 50 μm is used. A single-core fiber array retaining a 1.55 μm-band PANDA fiber and a single-core fiber array retaining a single mode fiber are connected to the inlet side and outlet side of a traveling-wave optical modulator chip, respectively. The optical fiber and the optical waveguide were mutually aligned and adhered by use of an ultraviolet-curable resin.

Figure 10:
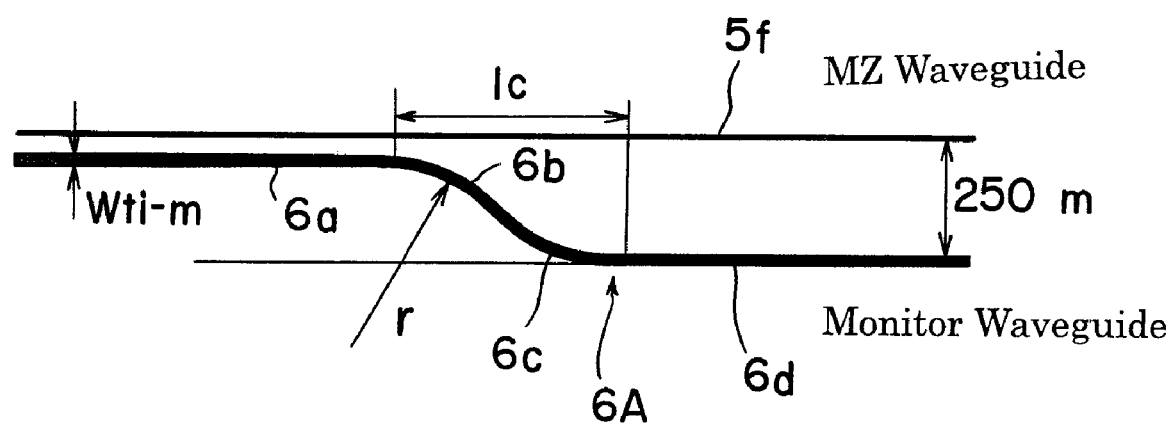
FIG. 10 is a view illustrating the planar positional relation between the signal light emission part 5f and the guiding waveguide of the optical modulator 1.

The pitch interval in the optical fiber array 9 is set to 250 μm which is used in a general fiber array. Wti-m (refer to FIG. 5) is desirably set to the same as the core diameter of the fiber. In the case of a GI fiver, for example, the core diameter is about 50 μm, and Wti-m is made 50 μm. For attaining an S-shaped curve, each curvature radius r in the curved parts 6b and 6c is set to 5 mm. FIG. 10 shows the positional relation between each guide waveguide and the emission part 5f. In this state, DC bias voltage of the operational point could be controlled.

Example 2

Investigation was performed for the optical modulator described in reference to FIGS. 4 and 5.

Figure 6:
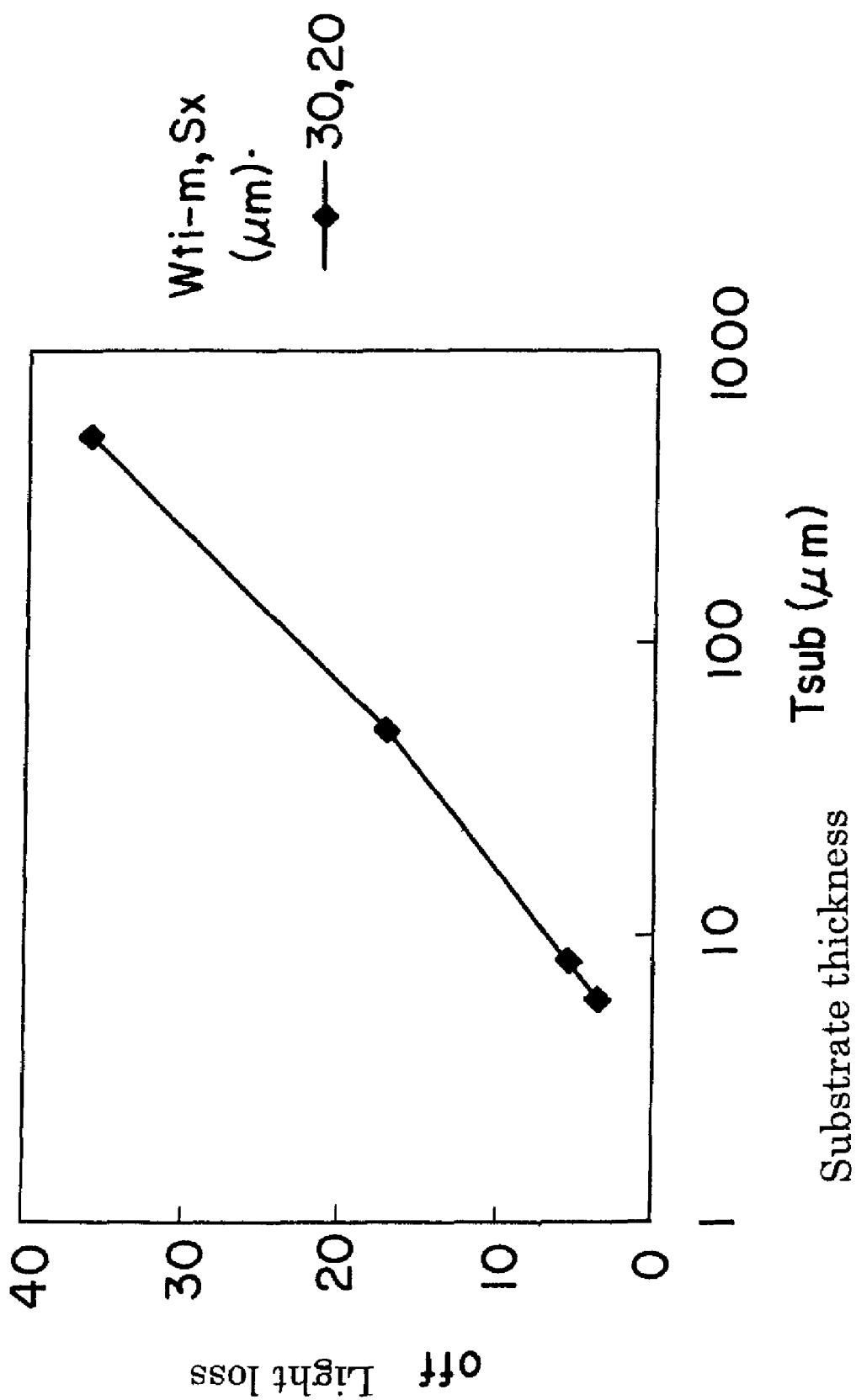
FIG. 6 is a graph showing the relation between substrate thickness and optical loss.
Figure 11:
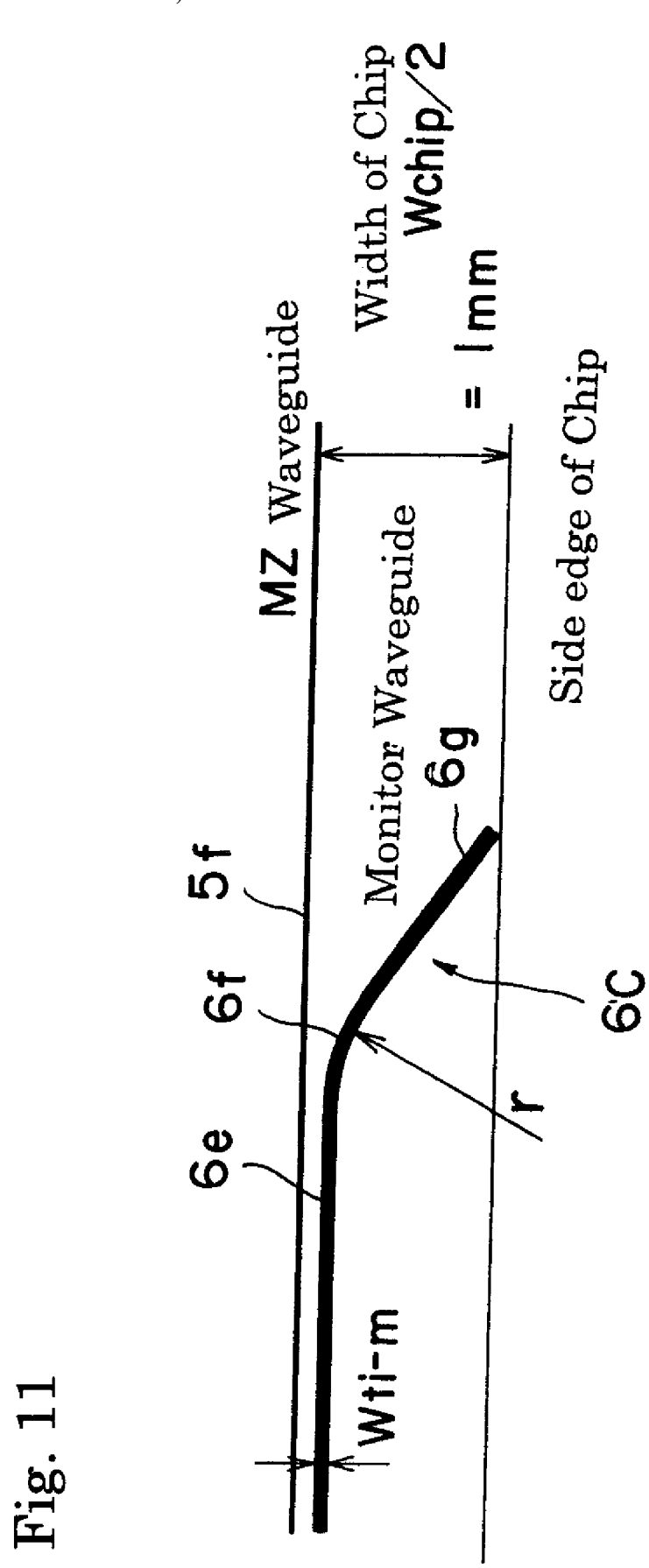
FIG. 11 is a view showing the planar positional relation between the signal light emission part 5f and the guiding waveguide of the optical modulator 1A.

Concretely, the material of the optical modulator and the forming method of the optical waveguide are the same as in the Example 1. In a photodiode having a light receiving area of 50 μm, Wti-m was set to 30 μm in consideration of spread. The curvature radius r of the curved part of the guiding waveguide was set to 5 mm. The substrate thickness of the optical modulator was changed as shown in FIG. 6 with λ of 1.55 μm. FIG. 11 shows the planar positional relation of the guide waveguide and the emission part 5f. The distance Sx between the edge of each guide waveguide and the central axis of the emission part is 20 μm.

The optical loss of off-light (primary mode light) was measured while changing the thickness Tsub of the substrate in this state. Consequently, the results shown in FIG. 6 were obtained. Namely, it was found that when the thickness of the substrate is 20 μm or less, the optical loss can be remarkably suppressed to 10 dB or less even if the curvature radius of the curved part of the guiding waveguide is as small as 5 mm. Accordingly, the emission part of the guiding waveguide can be considerably separated from the signal light emission part 5f.

Example 3

Figure 7:
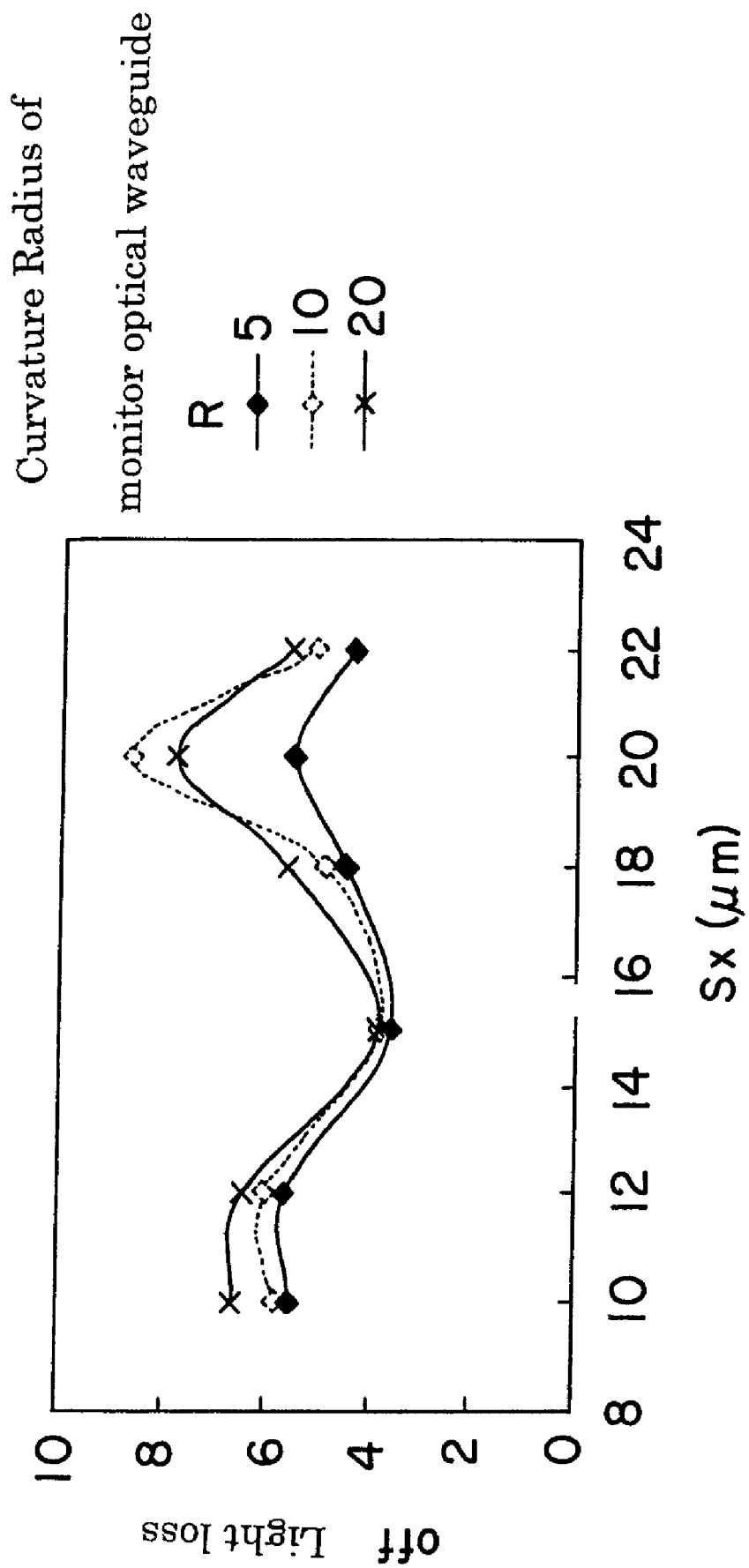
FIG. 7 is a graph showing the relation of optical loss and the distance between a guiding waveguide and a signal light emission part.

The optical loss of the primary mode light propagating in the guiding waveguide was tested in the same manner as in the Example 2. In this example, λ is 1.55 μm, the substrate thickness Tsub of the optical modulator is 8 μm, titanium thickness Tti is 600 Å, the width Wti of the signal light emission part is 5 μm, and the width Wti-m of the guiding waveguide is 30 μm. The distance Sx between the edge of the guiding waveguide and the central axis of the emission part and the curvature radius r of the curved part of the guiding waveguide were changed as shown in FIG. 7.

As a result, the optical loss at R of 20 μm or less was suppressed to 10 dB or less. Even if Sx is variously changed between 10 μm and 100 μm, the optical loss in the guiding waveguide was not substantially increased.

Example 4

The optical loss of the primary mode light propagating in the guiding waveguide was tested in the same manner as in the Example 3. In this example, λ is 1.55 μm, the substrate thickness Tsub of the optical modulator is 8 μm, titanium thickness Tti is 600 Å, and the width Wti-m of the guiding waveguide is 30 μm. The distance Sx between the edge of the guiding waveguide and the central axis of the emission part is 20 μm (FIG. 8) or 15 μm (FIG. 9). The curvature radius r of the curved part of the guiding waveguide is 3 mm. The width Wti of the signal light emission part was changed as shown in FIGS. 8 and 9.

Figure 8:
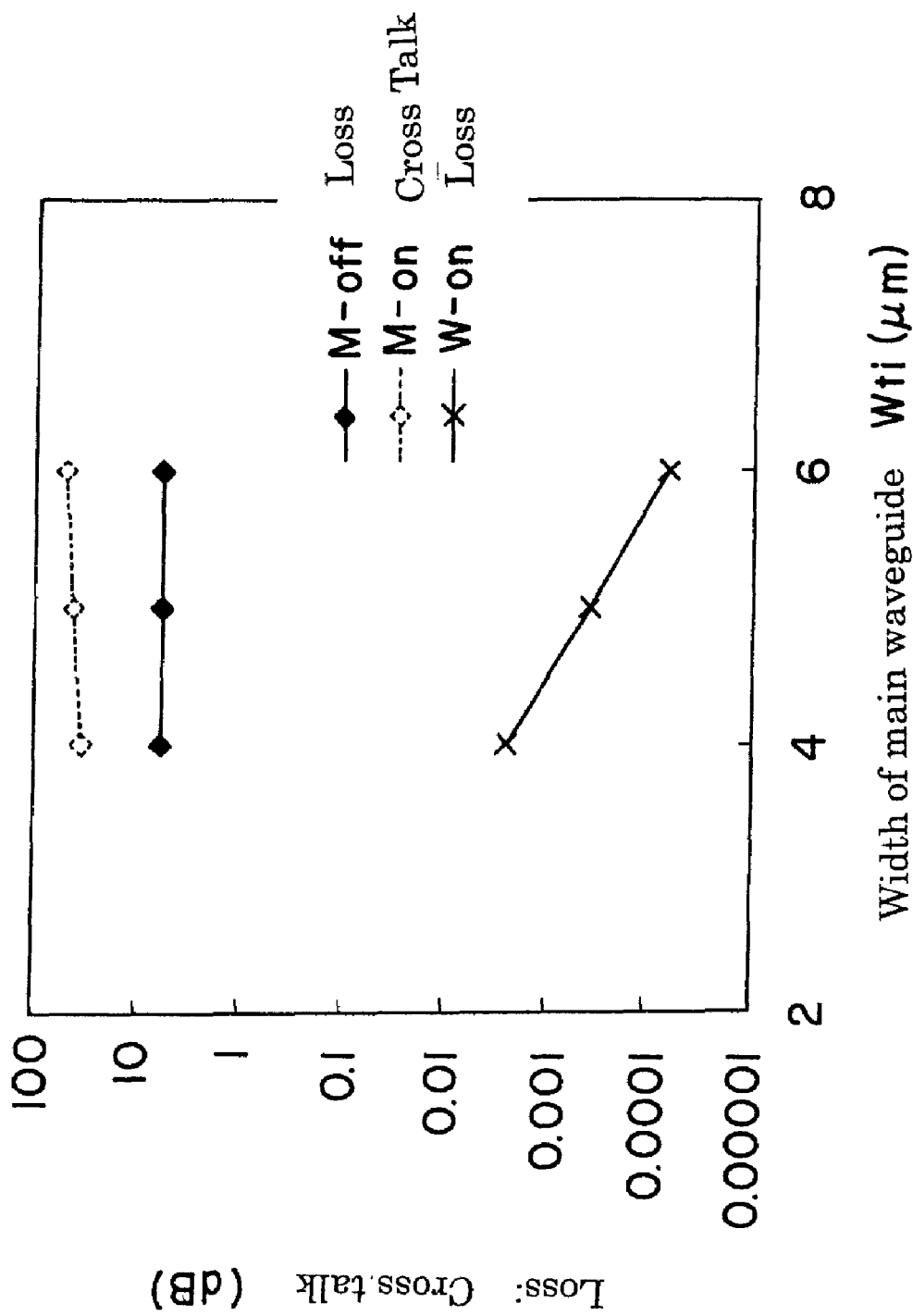
FIG. 8 is a graph showing the relation of the width of the signal light emission part with optical loss and crosstalk.
Figure 9:
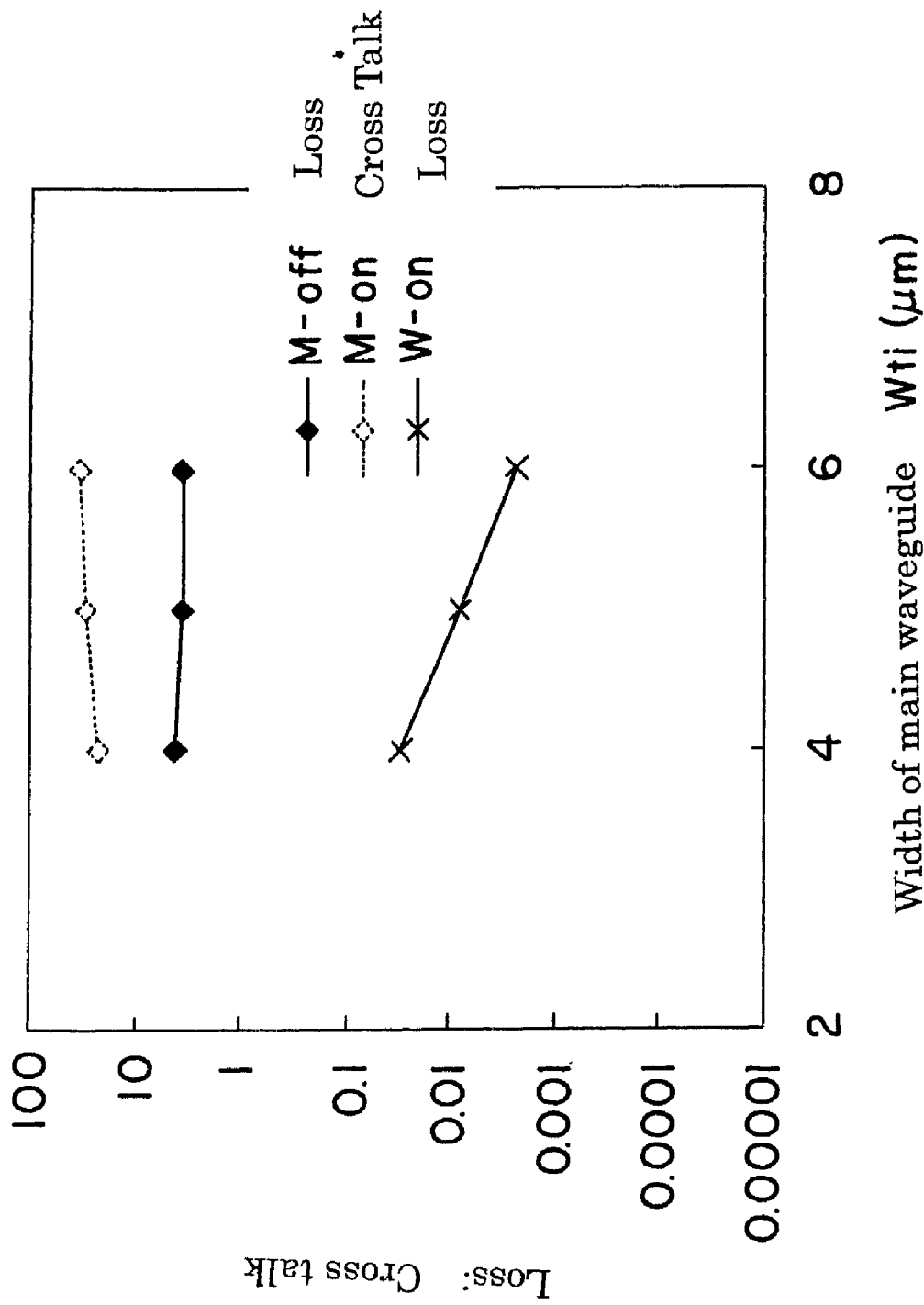
FIG. 9 is a graph showing the relation of the width of the signal light emission part with optical loss and crosstalk.

FIGS. 8 and 9 show the losses in off-time and on-time and the crosstalk ratio to the monitor waveguide in on-time of MZ waveguide of the modulator having the monitor waveguides of waveguide line widths Wti of 4 μm, 5 μm and 6 μm, respectively. As is apparent therefrom, in both Sx of 15 μm and 20 μm, the loss in off-time of the monitor waveguide is small in all Wti widths, with no crosstalk in on-time, and the loss of the MZ waveguide in on-time is also ignorable. In the case of Sx of 15 μm, the loss in off-time of the monitor waveguide is small as Wti is increased, with no crosstalk in on-time, and the loss of the MZ waveguide in on-time is also ignorable. This proves that enhanced confinement of light in MZ waveguide makes connection with the monitor waveguide difficult. This effect is further notable in the case that Sx is 20 μm.

The invention claimed is:

1. An optical modulator for modulating light propagating in a three-dimensional optical waveguide by applying a voltage thereto, said modulator comprising:
    a substrate comprising a ferroelectric material;
    a three-dimensional optical waveguide comprising at least one pair of branch optical waveguides, a multiplexing part of said branch optical waveguides, and a single emission part provided in the downstream of said multiplexing part for emitting signal light;
    a modulation electrode for applying a signal voltage for modulating light propagating in said three-dimensional optical waveguide; and
    a guiding waveguide for guiding primary mode light from said multiplexing part, the guiding waveguide being provided inside said substrate and having an incident end and an emitting end, wherein said incident end of the guiding waveguide is provided downstream of said multiplexing part, said emitting end of the guiding waveguide is provided at an end face of said substrate, and said incident end evanescently couples primary mode light from said multiplexing part;
    wherein said substrate has a thickness of 20 μm or less at least under said modulation electrode, wherein an operational point of said optical modulator can be controlled by changing a DC bias applied on said modulation electrode based on optical output from said guiding waveguide, wherein the guiding waveguide is provided in one side of said emitting part and is separated from said emitting part and said multiplexing part, wherein the minimum distance from the central axis of said multiplexing part to said guiding waveguide is 10 μm or more.

2. The optical modulator of claim 1, wherein said guiding waveguide comprises a curved part.

3. The optical modulator of claim 2, wherein said curved part has a radius of curvature of 30 mm or less.

4. The optical modulator of claim 1, wherein said primary mode light from said guiding waveguide exits from a side face of said optical modulator.

5. The optical modulator of claim 1, wherein said guiding waveguide is formed in one side of said emission part, said modulator further comprising an additional guiding waveguide for primary mode light formed in the other side of said emission part.

* * * * *